United States Patent
Takimoto

(10) Patent No.: US 11,921,277 B2
(45) Date of Patent: Mar. 5, 2024

(54) IMAGE ACQUISITION DEVICE AND IMAGE ACQUISITION METHOD

(71) Applicant: HAMAMATSU PHOTONICS K.K., Hamamatsu (JP)

(72) Inventor: Satoshi Takimoto, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 527 days.

(21) Appl. No.: 16/772,983

(22) PCT Filed: Nov. 6, 2018

(86) PCT No.: PCT/JP2018/041232
§ 371 (c)(1),
(2) Date: Jun. 15, 2020

(87) PCT Pub. No.: WO2019/123869
PCT Pub. Date: Jun. 27, 2019

(65) Prior Publication Data
US 2021/0080711 A1 Mar. 18, 2021

(30) Foreign Application Priority Data
Dec. 18, 2017 (JP) .................................. 2017-241667

(51) Int. Cl.
*G02B 21/06* (2006.01)
*G02B 21/10* (2006.01)
(Continued)

(52) U.S. Cl.
CPC ........... *G02B 21/367* (2013.01); *G02B 21/10* (2013.01); *G02B 21/24* (2013.01); *H04N 23/55* (2023.01)

(58) Field of Classification Search
CPC .............. G02B 21/00; G02B 21/0012; G02B 21/0016; G02B 21/002; G02B 21/0024;
(Continued)

(56) References Cited

U.S. PATENT DOCUMENTS 5,504,543 A * 4/1996 Ueno .................... A61B 3/145
396/18
7,580,121 B2 * 8/2009 Fukui ................. G03F 7/70641
356/123
(Continued)

FOREIGN PATENT DOCUMENTS

JP 10-233517 * 8/1998
JP H11-133309 A 5/1999
(Continued)

OTHER PUBLICATIONS

Machine English translation of the Japanese referemce No. JP 11-133309 published on May 1999.*
(Continued)

*Primary Examiner* — Thong Q Nguyen
(74) *Attorney, Agent, or Firm* — Faegre Drinker Biddle & Reath LLP

(57) ABSTRACT

An image acquisition device includes: a stage on which a sample is placed; a drive unit; a first irradiation optical system; a second irradiation optical system; a beam splitter; a pupil dividing element; a first imaging lens; a first imaging element; an analysis unit; a control unit; a second imaging lens; and a second imaging element, a first irradiation light irradiation range captured by the first irradiation optical system includes a second imaging region captured by the second imaging element, the second imaging region is located behind a first imaging region in a scanning direction, and the control unit controls a focus position of an objective
(Continued)

lens based on focus information before capturing the second imaging region by the second imaging element.

15 Claims, 12 Drawing Sheets

(51) Int. Cl.
*G02B 21/24* (2006.01)
*G02B 21/36* (2006.01)
*H04N 23/55* (2023.01)

(58) Field of Classification Search
CPC ............ G02B 21/0032; G02B 21/0036; G02B 21/0052; G02B 21/006; G02B 21/0064; G02B 21/008; G02B 21/02; G02B 21/025; G02B 21/06; G02B 21/088; G02B 21/125; G02B 21/14; G02B 21/18; G02B 21/21; G02B 21/241; G02B 21/245; G02B 21/247; G02B 21/36; G02B 21/361; G02B 21/367; G02B 21/368
USPC .................................................. 359/368–398
See application file for complete search history.

(56) References Cited

U.S. PATENT DOCUMENTS

| | | | |
|---|---|---|---|
| 9,164,242 B1 * | 10/2015 | Li | ............................. G02B 6/34 |
| 2007/0217735 A1 * | 9/2007 | Cai | ....................... G02B 6/3528 |
| | | | 385/16 |
| 2015/0022651 A1 | 1/2015 | Wu | |
| 2016/0142617 A1 * | 5/2016 | Oishi | ................... G02B 21/245 |
| | | | 348/350 |
| 2016/0156832 A1 | 6/2016 | Oishi et al. | |

FOREIGN PATENT DOCUMENTS

| | | | |
|---|---|---|---|
| JP | 2000-035540 A | | 2/2000 |
| JP | 2003-68612 | * | 3/2003 |
| JP | 2009-58776 | * | 3/2009 |
| JP | 2011-081211 A | | 4/2011 |
| JP | 2012-058665 A | | 3/2012 |
| JP | 2015-087719 A | | 5/2015 |
| JP | 2011-182041 | * | 6/2016 |
| WO | WO-2014/112084 A1 | | 7/2014 |

OTHER PUBLICATIONS

International Preliminary Report on Patentability dated Jul. 2, 2020 in PCT/JP2018/041232.

* cited by examiner

*Fig.2*
(a)
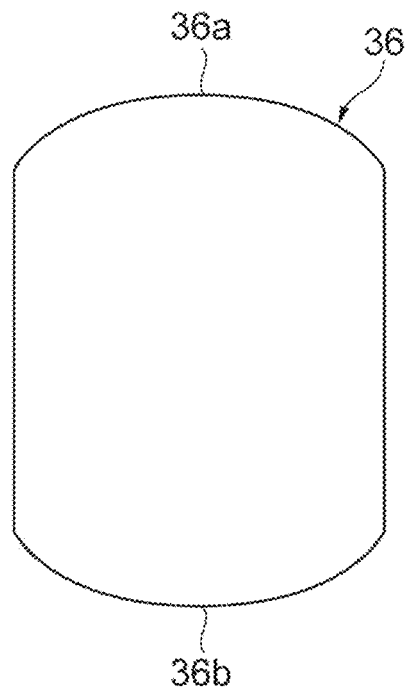
(b)
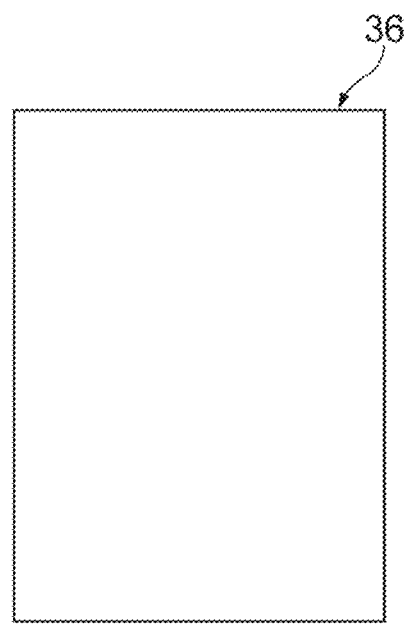

IMAGE ACQUISITION DEVICE AND IMAGE ACQUISITION METHOD

TECHNICAL FIELD

The present disclosure relates to an image acquisition device and an image acquisition method.

BACKGROUND ART

As an image acquisition device, there is a virtual microscope device which divides an imaging region of a sample into a plurality of regions in advance, captures each divided region at a high magnification, and synthesizes images of the plurality of regions. For example, an image acquisition device described in Patent Literature 1 includes a first imaging means, a second imaging means, an automatic focusing control means, and a timing control means. The second imaging means captures a region in front of a region to be captured by the first imaging means. The automatic focusing control means adjusts a focus position of an objective lens at an imaging position of the first imaging means on the basis of an image captured by the second imaging means. The timing control means aligns a timing at which a divided region moves from an imaging position of the second imaging means to an imaging position of the first imaging means and a timing at which an image formation position of the divided region captured by the second imaging means is located on an imaging surface of the first imaging means in response to a distance between the divided regions and a sample moving speed.

CITATION LIST

Patent Literature

Patent Literature 1: Japanese Unexamined Patent Publication No. 2011-081211

SUMMARY OF INVENTION

Disclosed herein are image acquisition devices which include: a stage a sample is placed so as to face an objective lens; a drive unit configured to move a relative position of the stage with respect to the objective lens in a scanning direction intersecting an optical axis of the objective lens; a first irradiation optical system configured to emit first irradiation light to be used for the irradiation of the sample; a second irradiation optical system configured to emit second irradiation light to be used for the irradiation of the sample; a beam splitter configured to branch the first irradiation light and the second irradiation light guided by the objective lens into a first optical path for controlling a focus and a second optical path for acquiring an image; a pupil dividing element configured to divide an optical image of the sample in the first optical path into a first optical image and a second optical image; a first imaging lens configured to form each of the first optical image and the second optical image; a first imaging element configured to include an imaging surface having a plurality of pixels arranged in two dimensions, and acquire first image data by sub-array reading for at least a part of each of the first optical image and the second optical image formed on the imaging surface by the first imaging lens; an analysis unit configured to analyze the first image data and obtain focus information of the objective lens in a first imaging region captured by the sub-array reading; a control unit configured to control a focus position of the objective lens based on the focus information obtained by the analysis unit; a second imaging lens configured to form an optical image of the sample in the second optical path; and a second imaging element configured to capture an optical image of the sample formed by the second imaging lens and acquire second image data for forming an image of the sample. An irradiation range of the first irradiation light by the first irradiation optical system includes a second imaging region captured by the second imaging element. The second imaging region is located behind the first imaging region in the scanning direction. The control unit controls a focus position of the objective lens based on the focus information before capturing the second imaging region by the second imaging element.

In some examples, the pupil dividing element includes a pupil division prism and an achromatic prism having a refractive index different from a refractive index of the pupil division prism. In some examples, the first imaging lens has a magnification smaller than a magnification of the second imaging lens. In some examples, the image acquisition device further includes a mask which is provided at a position of a pupil of the objective lens in the second optical path so that each of the first optical image and the second optical image passes therethrough. In some examples, the image acquisition device further includes a relay optical system configured to relay the pupil of the objective lens in the second optical path. The mask is disposed at a position of the pupil of the objective lens relayed by the relay optical system. In some examples, the image acquisition device further includes a field stop which is disposed on a primary image plane in the relay optical system. In some examples, the first irradiation light and the second irradiation light are instantaneous lights irradiated at different timings. In some examples, the first irradiation optical system further includes a dark-field mask at a position conjugate with the pupil of the objective lens.

Further disclosed are image acquisition methods which include: a first irradiation step of irradiating a sample facing an objective lens with first irradiation light in a predetermined irradiation range; a pupil dividing step of dividing an optical image of the sample guided by the objective lens into a first optical image and a second optical image by pupil dividing; a first image acquisition step of acquiring first image data by sub-array reading for at least a part of each of the first optical image and the second optical image using a first imaging element with an imaging surface having a plurality of pixels arranged in two dimensions; an analysis step of analyzing the first image data and obtaining focus information of the objective lens in a first imaging region captured by the sub-array reading; a focus control step of controlling a focus position of the objective lens based on the focus information obtained by the analysis step; and a second image acquisition step of capturing an optical image of the sample irradiated with second irradiation light different from the first irradiation light using a second imaging element and acquiring second image data. The predetermined irradiation range includes a second imaging region captured by the second imaging element. At least between the first image acquisition step and the second image acquisition step, the second imaging region is moved to the first imaging region by a scanning operation and the analysis step and the focus control step are performed.

In some examples, in the first image acquisition step, chromatic aberration of the first optical image and the second optical image divided from each other is corrected. In some examples, in the first image acquisition step, the first image data is acquired at a magnification smaller than a magnification of the second image data acquired in the second image acquisition step. In some examples, in the first image acquisition step, the first optical image and the second optical image are allowed to pass by a mask disposed at a position of a pupil of the objective lens. In some examples, in the first image acquisition step, fields of view of the first optical image and the second optical image are limited by a field stop. In some examples, in the second image acquisition step, irradiation of the first irradiation light is stopped. In some examples, both the first irradiation light and the second irradiation light are instantaneous lights. In some examples, in the first irradiation step, a part of the first irradiation light is interrupted by a dark-field mask.

BRIEF DESCRIPTION OF DRAWINGS

FIG. 2 is a diagram illustrating a shape of an aperture of a field stop.

DESCRIPTION OF EMBODIMENTS

Figure 1:
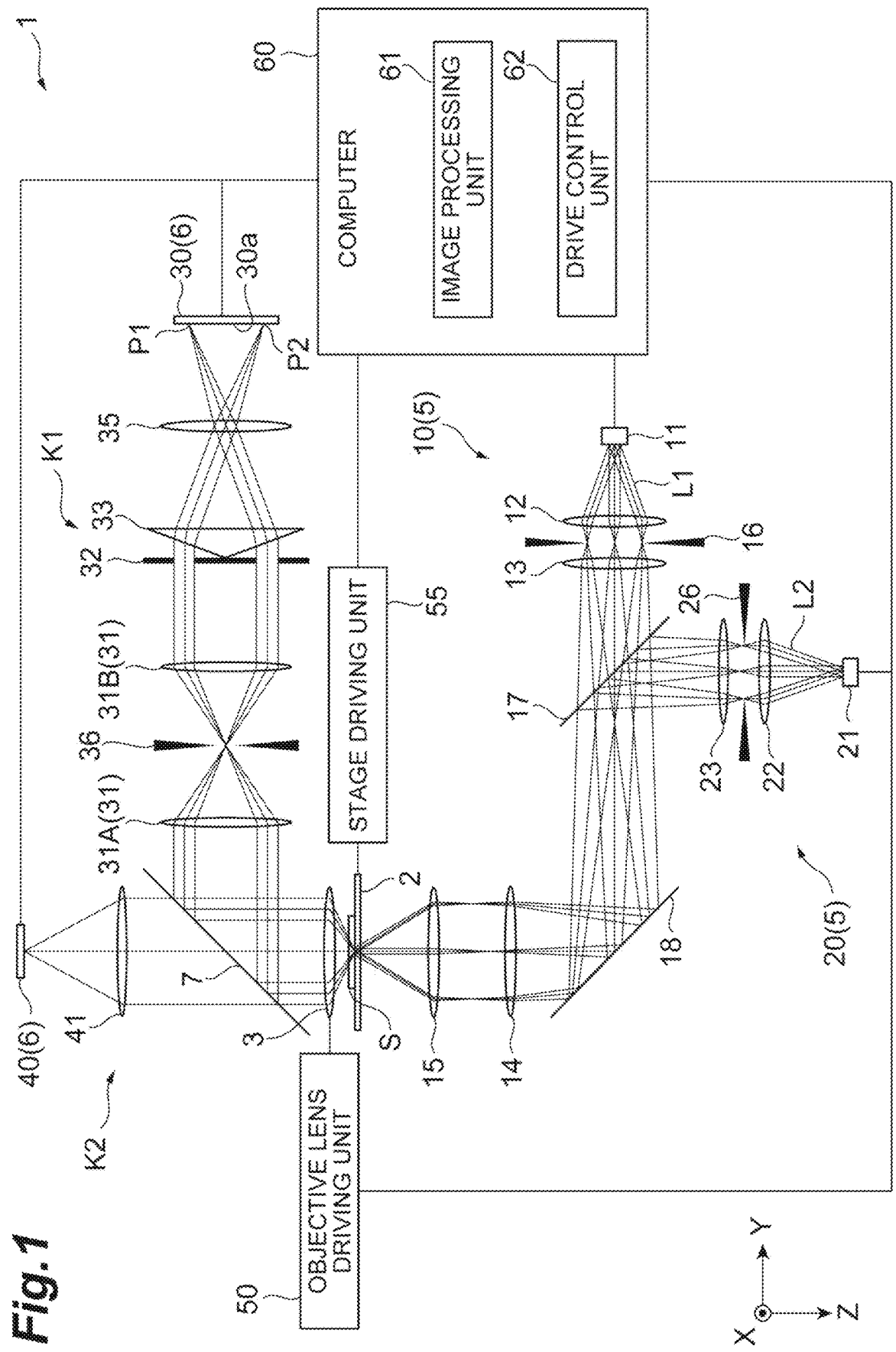
FIG. 1 is a diagram illustrating a configuration of an image acquisition device according to an embodiment.

The image acquisition device includes an optical path branching means which branches light from the objective lens into a first optical path toward the first imaging means and a second optical path toward the second imaging means. Then, since the optical surface of the optical path branching means is inclined at a predetermined angle, a region captured by the second imaging means is adjusted to a front side of a region captured by the first imaging means in the scanning direction. Accordingly, an image of the focus position is acquired prior to the scanning.

However, in such a configuration, it is difficult to adjust the optical surface forming the optical path branching means. Particularly, when the scanning direction is variable, since it is necessary to adjust the optical surface whenever changing the scanning direction, there is concern that the optical adjustment is more difficult. Further, the image acquisition device includes an optical path difference optical system which branches the second optical path into a third optical path and a fourth optical path. Then, the second imaging means captures light having passed through the optical path difference optical system. However, since the optical path difference optical system is configured as a half mirror and a mirror, it is considered that the light having passed through the optical path difference optical system does not easily enter the imaging surface of the second imaging means.

An object of an aspect of the present disclosure is to provide an image acquisition device and an image acquisition method capable of easily performing optical adjustment.

An image acquisition device of an aspect includes: a stage on which a sample is placed so as to face an objective lens; a drive unit which moves a relative position of the stage with respect to the objective lens in a scanning direction intersecting an optical axis of the objective lens; a first irradiation optical system which emits first irradiation light to be used for the irradiation of the sample; a second irradiation optical system which emits second irradiation light to be used for the irradiation of the sample; a beam splitter which branches the first irradiation light and the second irradiation light guided by the objective lens into a first optical path for controlling a focus and a second optical path for acquiring an image; a pupil dividing element which divides an optical image of the sample in the first optical path into a first optical image and a second optical image; a first imaging lens which forms each of the first optical image and the second optical image; a first imaging element which includes an imaging surface having a plurality of pixels arranged in two dimensions, and acquires first image data by sub-array reading for at least a part of each of the first optical image and the second optical image formed on the imaging surface by the first imaging lens; an analysis unit which analyzes the first image data and obtains a focus position in a first imaging region of the sample; a focus control unit which controls a focus position of the objective lens on the basis of the analysis result of the analysis unit; a second imaging lens which forms an optical image of the sample in the second optical path; and a second imaging element which captures an optical image of the sample formed by the second imaging lens and acquires second image data for forming an image of the sample, in which an irradiation range of the first irradiation light by the first irradiation optical system includes a second imaging region captured by the second imaging element, the second imaging region is located behind the first imaging region read in the sub-array by the first imaging element in the scanning direction, and the focus control unit controls the focus position of the objective lens on the basis of the analysis result before capturing the second imaging region by the first imaging element.

In such an image acquisition device, the optical image of the sample guided by the objective lens is branched by the beam splitter into the first optical path and the second optical path. The first optical path can be used to control a focus. The second optical path can be used to acquire an image. In the first optical path, the optical image when the sample is irradiated with the first irradiation light is captured by the first imaging element. This optical image is divided into the first optical image and the second optical image by the pupil dividing element. In the first imaging element, a part of the first optical image and the second optical image formed by the first imaging lens is captured by the sub-array reading and the first image data of the first imaging region is acquired. The analysis unit obtains the focus position of the objective lens in the first imaging region by analyzing the first image data. Meanwhile, the optical image when the sample is irradiated with the second irradiation light in the second optical path is captured by the second imaging element. Here, the second imaging region captured by the second imaging element is behind the first imaging region captured by the sub-array reading of the first imaging element in the scanning direction. For that reason, a region corresponding to the first imaging region can be moved to the second imaging region with the movement of the stage.

Since the focus position of the objective lens is controlled on the basis of the analysis result of the analysis unit when the second imaging region moves to the first imaging region, the second image data is acquired at the suitable focus position. As described above, the image of the first imaging region is acquired by the sub-array reading in the image acquisition device. Since the irradiation range of the first irradiation light is widely set so as to include the second imaging region, the image data of the first imaging region is acquired while the second imaging region is included in the irradiation range of the first irradiation light. Thus, for example, since the optical axes of the first irradiation optical system and the second irradiation optical system can be allowed to match each other, the optical adjustment is easily performed.

Further, the pupil dividing element may include a pupil division prism and an achromatic prism having a refractive index different from a refractive index of the pupil division prism. In this configuration, it is possible to correct chromatic aberration generated in the pupil division prism.

Further, the first imaging lens may have a magnification smaller than a magnification of the second imaging lens. In this configuration, the range of the optical image formed by the first imaging lens is easily made larger than the range of the optical image formed by the second imaging lens.

Further, a mask which allows each of the first optical image and the second optical image to pass therethrough is further provided at a position of the pupil of the objective lens in the second optical path. In this configuration, it is possible to limit the numerical aperture (NA) of the objective lens.

Further, a relay optical system which relays the pupil of the objective lens disposed between the beam splitter and the pupil dividing element in the second optical path may be further provided. In this case, the mask may be disposed at a position of the pupil of the objective lens relayed by the relay optical system. Also in this configuration, the numerical aperture of the objective lens can be limited.

Further, a field stop which is disposed on a primary image plane in the relay optical system may be further provided. In this configuration, the interference between the first optical image and the second optical image formed by the first imaging lens is prevented.

Further, the first irradiation light and the second irradiation light may be instantaneous lights irradiated at different timings. In this configuration, it is possible to exclude the influence of the second irradiation light on the optical image during the irradiation of the second irradiation light.

Further, the first irradiation optical system may further include a dark-field mask at a position conjugate with the pupil of the objective lens. In this configuration, for example, the observation of the fluorescent sample can be suitably performed.

Further, an image acquisition method of an aspect includes: a first irradiation step of irradiating a sample facing an objective lens with first irradiation light in a predetermined irradiation range; a pupil dividing step of dividing an optical image of the sample guided by the objective lens into a first optical image and a second optical image by pupil dividing; a first image acquisition step of acquiring first image data by sub-array reading for at least a part of each of the first optical image and the second optical image using a first imaging element with an imaging surface having a plurality of pixels arranged in two dimensions; an analysis step of analyzing the first image data and obtaining focus information of the objective lens in a first imaging region captured by the sub-array reading; a focus control step of controlling a focus position of the objective lens on the basis of the focus information obtained by the analysis step; and a second image acquisition step of capturing an optical image of the sample irradiated with second irradiation light different from the first irradiation light using a second imaging element and acquiring second image data, in which the predetermined irradiation range includes a second imaging region captured by the second imaging element, and in which at least between the first image acquisition step and the second image acquisition step, the second imaging region is moved to the first imaging region by a scanning operation and the analysis step and the focus control step are performed.

In such an image acquisition method, the image of the first imaging region is acquired by the sub-array reading. Since the irradiation range of the first irradiation light is widely set so as to include the second imaging region, it is possible to acquire the image data of the first imaging region while the second imaging region is included in the irradiation range of the first irradiation light. Thus, for example, since the optical axes of the first irradiation light and the second irradiation light can be easily allowed to match each other, the optical adjustment can be easily performed.

Further, in the first image acquisition step, chromatic aberration of the first optical image and the second optical image divided from each other may be corrected.

Further, in the first image acquisition step, the first image data may be acquired at a magnification smaller than a magnification of the second image data acquired in the second image acquisition step. In this configuration, the irradiation range of the first irradiation light is easily made larger than an imaging visual field range.

Further, in the first image acquisition step, the first optical image and the second optical image may be allowed to pass by a mask disposed at a position of the pupil of the objective lens. In this configuration, a numerical aperture of the objective lens can be limited.

Further, in the first image acquisition step, the fields of view of the first optical image and the second optical image may be limited by a field stop. In this configuration, the interference between the first optical image and the second optical image is prevented.

Further, in the second image acquisition step, the irradiation of the first irradiation light may be stopped. In this case, both the first irradiation light and the second irradiation light may be instantaneous light. In this configuration, it is possible to exclude the influence of the second irradiation light on the optical image during the irradiation of the second irradiation light.

Further, in the first irradiation step, a part of the first irradiation light may be interrupted by the dark-field mask. In this configuration, for example, the observation of the fluorescent sample can be suitably performed.

Advantageously, according to an aspect of the present disclosure, it is possible to provide an image acquisition device and an image acquisition method capable of easily performing optical adjustment.

Hereinafter, embodiments will be described in detail with reference to the drawings. For convenience, substantially the same components will be denoted by the same reference numerals and a description thereof will be omitted.

FIG. 1 is a diagram illustrating a configuration of an image acquisition device according to the embodiment. As illustrated in FIG. 1, an image acquisition device 1 includes a stage 2 which holds a sample S, an objective lens 3 which is disposed so as to face the sample S on the stage 2, an irradiation optical system 5 which irradiates the sample S with light, and an imaging element 6 which captures an optical image guided by the objective lens 3.

The sample S is placed on the stage 2 so as to face the objective lens 3. In the embodiment, the sample S may be a biological sample such as a tissue cell. For example, the sample S is placed on the stage 2 while being sealed with a slide glass. A relative position of the stage 2 with respect to the objective lens 3 is movable in a scanning direction intersecting the optical axis of the objective lens 3. The magnification of the objective lens 3 may be, for example, a high magnification such as times, 40 times, or 100 times.

The irradiation optical system 5 includes a scanning irradiation optical system (a second irradiation optical system) 10 which captures an image and an AF irradiation optical system (a first irradiation optical system) 20 which controls an auto focus (AF). The scanning irradiation optical system 10 irradiates the sample S disposed on the stage 2 with light (second irradiation light) L1 emitted from a scanning light source 11. The light source 11 is a light source which outputs white light as illumination light and is disposed on a bottom surface side of the stage 2. As the light source 11, for example, a flash lamp type light source such as a laser diode (LD), a light emitting diode (LED), a super luminescent diode (SLD), and a xenon flash lamp is used.

The scanning irradiation optical system 10 includes a collector lens 12, a pair of relay lenses 13 and 14, and a condenser lens 15. A field stop 16 is disposed between the collector lens 12 and the relay lens 13. A beam splitter 17 and a mirror 18 are disposed between the pair of relay lenses 13 and 14. The light L1 emitted from the scanning light source 11 is input to the collector lens 12. The pair of relay lenses 13 and 14 relay the light L1 output from the collector lens 12 to the condenser lens 15. The condenser lens 15 irradiates the sample S with the light L1 emitted from the scanning light source 11. The numerical aperture (NA) of the scanning irradiation optical system 10 can be changed.

The AF irradiation optical system 20 irradiates the sample S disposed on the stage 2 with light (first irradiation light) L2 emitted from an AF light source 21. The AF light source 21 is disposed on a bottom surface side of the stage 2. As the light source 21, for example, a flash lamp type light source such as a laser diode (LD), a light emitting diode (LED), a super luminescent diode (SLD), and a xenon flash lamp is used. The illumination light may be white light. Further, the irradiation light may be infrared light such as near infrared light. The light source 11 and the light source 21 output illumination light by receiving a control signal from a drive control unit (a control unit) 62 to be described later.

The AF irradiation optical system 20 includes a collector lens 22, a pair of relay lenses 23 and 14, and the condenser lens 15. A field stop 26 is disposed between the collector lens 22 and the relay lens 23. The irradiation range of the AF irradiation optical system 20 includes the irradiation range of the scanning irradiation optical system 10 due to the field stop 26 of the AF irradiation optical system 20 and the field stop 16 of the scanning irradiation optical system 10. The irradiation range of the AF irradiation optical system 20 is set so that a wider range can be illuminated. The beam splitter 17 and the mirror 18 are disposed between the pair of relay lenses 23 and 14. The relay lens 14 and the condenser lens 15 at the rear stage of the beam splitter 17 and the mirror 18 are common to the scanning irradiation optical system 10. That is, the light L2 which is input from the AF light source 21 to the collector lens 22 and is output from the relay lens 23 of the front stage is reflected by the beam splitter 17 and is input to the relay lens 14 of the rear stage. The light L2 which is emitted from the AF light source 21 finally follows the same optical path as the scanning irradiation optical system 10 and is output from the condenser lens 15. That is, the scanning irradiation optical system 10 and the AF irradiation optical system 20 have the same optical axis at the rear stage of the beam splitter 17.

The imaging element 6 captures the optical image of the sample S guided by the objective lens 3. The optical image of the sample S is an image formed by transmitted light in the case of bright field illumination, an image formed by scattered light in the case of dark field illumination, and an image formed by emitted light (fluorescence) in the case of light emission observation (fluorescence observation). The imaging element 6 is an imaging element having a plurality of pixel rows. The imaging element 6 may be, for example, a CCD image sensor, a CMOS image sensor, or the like.

In the embodiment, an AF imaging element (a first imaging element) 30 and a scanning imaging element (a second imaging element) are used as the imaging element 6. The AF imaging element 30 captures the optical image of the sample S when the sample S is irradiated with light from the AF light source 21. The scanning imaging element captures the optical image of the sample S when the sample S is irradiated with light from the scanning light source 11. In the image acquisition device 1, the beam splitter 7 is disposed between the objective lens 3 and the imaging element 6 as illustrated in the drawing. By the beam splitter 7, the optical image of the sample S guided by the objective lens 3 (that is, the light L1 and the light L2) is branched into an AF optical path (a first optical path) K1 and a scanning optical path (a second optical path) K2. The beam splitter 7 includes, for example, a half mirror, a dichroic mirror, a polarization beam splitter, and the like.

The scanning imaging element 40 captures the optical image of the sample S formed by a scanning imaging lens (a second imaging lens) 41 in the scanning optical path K2 and acquires image data (second image data). That is, the imaging lens 41 is optically coupled to the objective lens 3 and forms the optical image of the scanning optical path K2 divided by the beam splitter 7 on the scanning imaging element 40.

Figure 5:
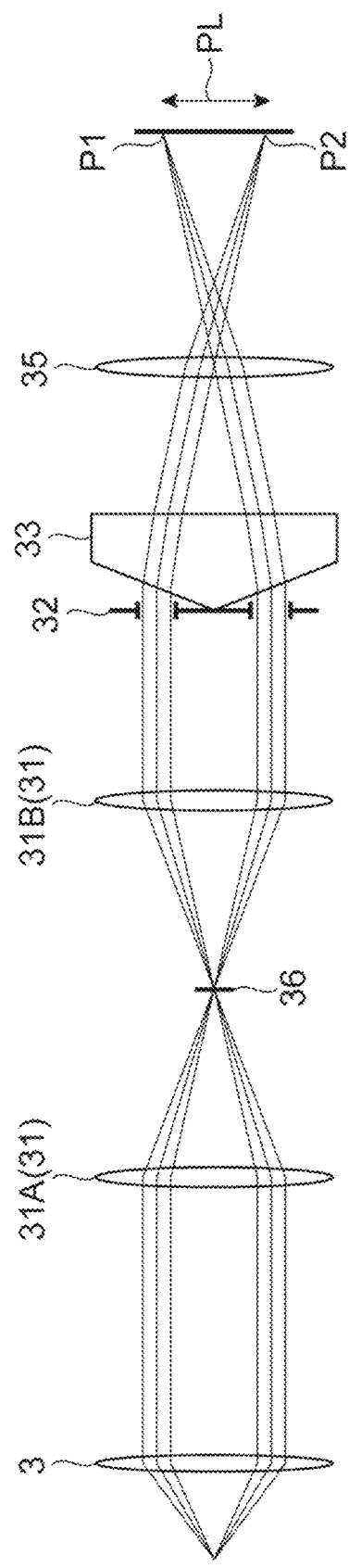
FIG. 5 is a diagram illustrating a focusing optical system.

In the AF optical path K1, a relay optical system 31, a mask 32, a pupil dividing element 33, an imaging lens (a first imaging lens) 35, and an AF imaging element 30 are disposed at the rear stage of the beam splitter 7. FIG. 5 is a diagram illustrating a configuration of the AF optical path. The relay optical system 31 is disposed between the beam splitter 7 and the pupil dividing element 33 and relays the pupil of the objective lens 3. The relay optical system 31 includes a pair of relay lenses 31A and 31B. A field stop 36 is disposed on a primary image plane in the relay optical system 31. FIG. 2 is a diagram illustrating an example of a shape of the field stop 36. For example, the field stop 36 may have a shape of a combination of a circular shape and a rectangular shape (see FIG. 2(*a*)). In other words, the field stop 36 may have a shape in which a pair of rectangular opposing sides 36a and 36b forms a circular arc of which a diameter is a diagonal of a rectangle. Further, the field stop 36 may have a rectangular shape as illustrated in FIG. 2(*b*).

Figure 3:
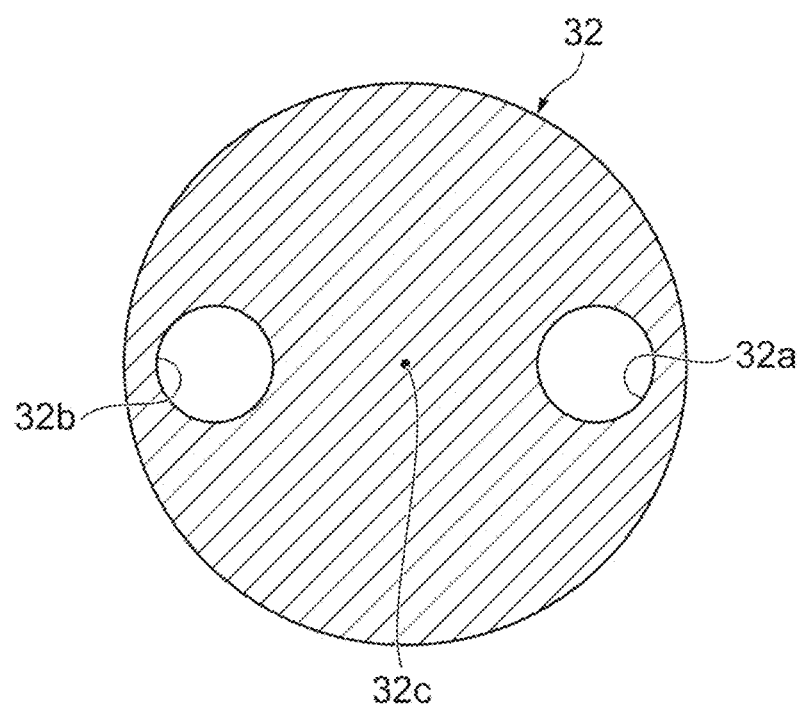
FIG. 3 is a diagram illustrating a shape of a mask.

The mask 32 limits the NA component of the objective lens 3. In the example illustrated in the drawing, the mask 32 is disposed at the position of the pupil of the objective lens 3 relayed by the relay optical system 31. FIG. 3 is a diagram illustrating the shape of the mask 32. As illustrated in FIG. 3, in the embodiment, the mask 32 includes an aperture 32a through which a first optical image P1 is transmitted and an aperture 32b through which a second optical image P2 is transmitted. The aperture 32a and the aperture 32b are formed at positions equidistant from a center 32c of the mask 32. The aperture 32a and the aperture 32b have the same diameter. The center 32c of the mask 32 matches the optical axis of the AF optical path K1. Additionally, in FIG. 3, hatched regions have light shielding properties. In addition, the mask 32 may be directly disposed at the position of the pupil of the objective lens 3.

Figure 4:
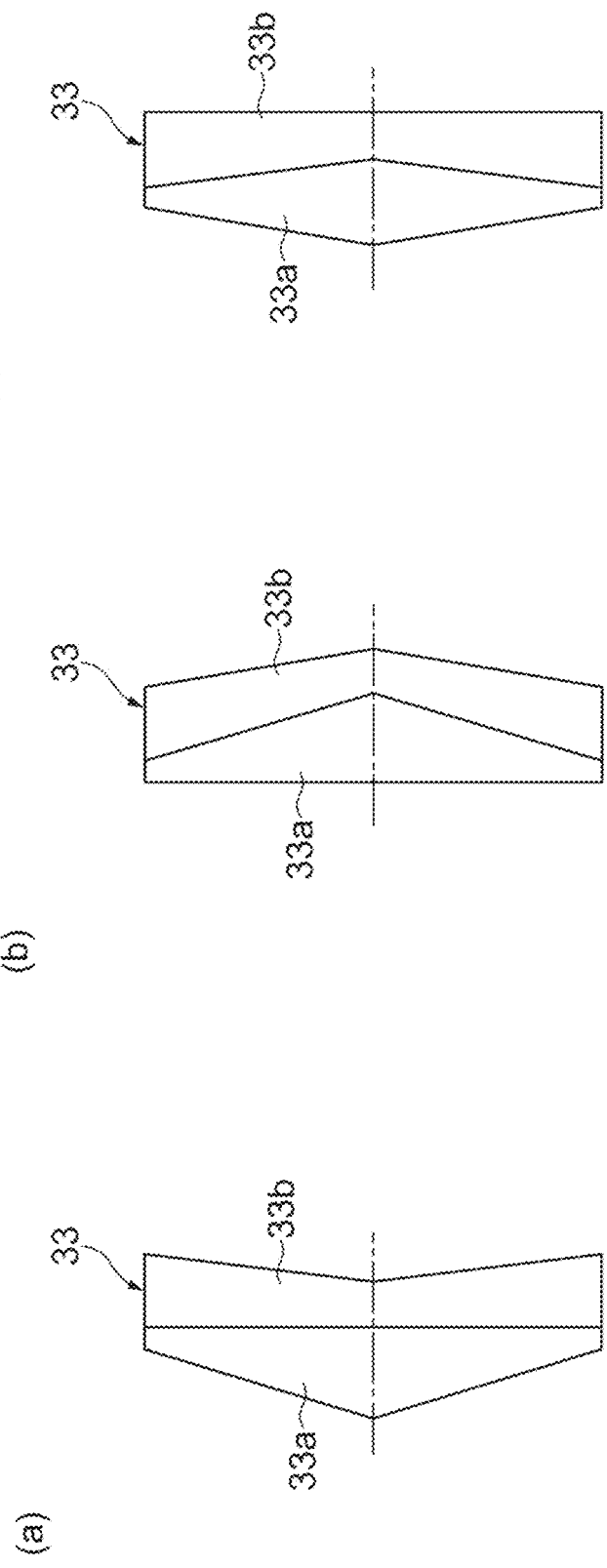
FIG. 4 is a cross-sectional view illustrating a pupil dividing element.

The pupil dividing element 33 divides the optical image of the sample S in the AF optical path K1 when the sample S is irradiated with the light L2 emitted from the AF light source 21 into the first optical image P1 and the second optical image P2. In the embodiment, the pupil dividing element 33 is disposed at the rear stage of the mask 32 and divides the first optical image P1 and the second optical image P2 transmitted through the apertures 32a and 32b of the mask 32. FIG. 4 is a cross-sectional view illustrating an example of the pupil dividing element 33. As illustrated in the drawing, the pupil dividing element 33 has a combination of a pupil division prism 33a and an achromatic prism 33b. In the embodiment, any pupil dividing element 33 illustrated in FIGS. 4(a), 4(b), and 4(c) may be used. In any pupil dividing element 33, the pupil division prism 33a has a thickness gradually decreasing from the center to the outside. Further, the achromatic prism 33b has a thickness gradually increasing from the center to the outside. The achromatic prism 33b has a refractive index different from the refractive index of the pupil division prism 33a so as to prevent chromatic aberration generated by the pupil division prism 33a.

The imaging lens 35 forms each of the first optical image P1 and the second optical image P2. The imaging lens 35 has an imaging magnification lower than the imaging magnification of the imaging lens 41. The imaging lens 35 is optically coupled to the objective lens 3 through the relay optical system 31. The imaging lens 35 forms each of the first optical image P1 and the second optical image P2 divided by the pupil dividing element 33 on an imaging surface 30a of the AF imaging element 30. The imaging surface 30a has a plurality of pixels arranged in two dimensions. The AF imaging element 30 can capture a plurality of pixels of the imaging surface 30a corresponding to a range included in the formed first and second optical images P1 and P2 by the sub-array reading. The sub-array reading is a reading method of the imaging element for reading a sub-array region formed by a plurality of set pixels among a plurality of pixels forming an imaging surface of the imaging element. Additionally, depending on the size of the AF imaging element 30, the imaging lens 35 does not necessarily need to have an imaging magnification lower than the imaging magnification of the imaging lens 41.

Further, the image acquisition device 1 includes an objective lens driving unit 50 which changes the focus position of the objective lens 3 with respect to the sample S, a stage driving unit 55 which moves the sample S at a predetermined speed in a direction (a scanning direction) intersecting the optical axis of the objective lens 3, and a computer 60 which controls an operation of the image acquisition device 1.

The objective lens driving unit 50 is configured as, for example, a motor such as a stepping motor (pulse motor) or an actuator such as a piezo actuator. The objective lens driving unit 50 drives the objective lens 3 in the Z direction along the optical axis of the objective lens 3 on the basis of the control of a drive control unit 62 to be described later. Accordingly, the focus position of the objective lens 3 with respect to the sample S is moved.

The stage driving unit 55 is configured as, for example, a motor such as a stepping motor (pulse motor) or an actuator such as a piezo actuator. The stage driving unit 55 drives the stage 2 in the XY directions on a plane having a predetermined angle (for example, 90°) with respect to a plane orthogonal to the optical axis of the objective lens 3 on the basis of the control of the drive control unit 62 to be described later. Accordingly, the sample S held by the stage 2 moves with respect to the optical axis of the objective lens 3 and the visual field position of the objective lens 3 with respect to the sample S moves. Further, the stage driving unit 55 can detect the position of the stage 2. For example, the stage driving unit 55 detects the XY coordinate of the stage 2 by a linear encoder attached to the stage 2. The stage driving unit 55 generates position information indicating a detection result and outputs the detection result to the computer 60.

The computer 60 physically includes a memory such as a RAM and a ROM, a processor (arithmetic circuit) such as a CPU, a communication interface, a storage unit such as a hard disk, and a display unit such as a display. As such a computer 60, for example, a personal computer, a microcomputer, a cloud server, a smart device (a smart phone, a tablet terminal, or the like), or the like can be used.

The computer 60 includes an image processing unit (an analysis unit) 61 and a drive control unit 62. The image processing unit 61 generates a virtual slide image of the sample S on the basis of the image data output from the scanning imaging element 40. Further, the image processing unit 61 calculates an in-focus position (an example of focus information) in the focus control region 39 on the sample S on the basis of the sub-array data output from the AF imaging element 30. The drive control unit 62 controls the objective lens driving unit 50 so that the focus position of the objective lens 3 becomes the in-focus position on the basis of the analysis result.

In the embodiment, the in-focus position is calculated by so-called phase difference focusing. In the phase difference focusing, the in-focus position is calculated on the basis of a distance PL of the imaging position between the sub-array data of the first optical image P1 and the sub-array data of the second optical image P2 divided by the pupil division prism 33a. The distance PL of the imaging position can be calculated by, for example, sum of absolute difference (SAD), sum of squared difference (SSD), normalized cross correlation (NCC), zero-mean normalized cross correlation (ZNCC), phase only correlation (POC), or the like.

For example, in the SAD, the distance PL can be derived by using the sum of the absolute values of the differences in the luminance values of the pixels at the same position between the first optical image P1 and the second optical image P2 and obtaining a position in which this value is small. In the SSD, the distance PL can be derived by using the sum of the squares of the differences between the luminance values of the pixels at the same position and obtaining a position in which this value is small. In the NCC and ZNCC, the distance PL can be derived by obtaining the position of the similarity using the normalized cross-correlation as the similarity of the image. In the POC, the distance PL can be derived by obtaining the position of the center of gravity of the phase only correlation data.

Further, the distance PL of the imaging position may be obtained by calculating the pixel position. In the drive control unit 62, the in-focus position can be derived by a table indicating a relationship between the distance PL of the imaging position and the in-focus position or a derivation formula for deriving the in-focus position from the distance PL of the imaging position.

Further, the drive control unit 62 controls the movement of the stage 2 by controlling the operation of the stage driving unit 55. Furthermore, the drive control unit 62 outputs a control signal to the scanning light source 11 and the AF light source 21 and controls the emission of the light by the scanning light source 11 and the AF light source 21. The computer 60 controls a lane scanning of the light sources 11 and 21, the stage driving unit 55, and the imaging element 6 using the image processing unit 61 and the drive control unit 62. Hereinafter, the lane scanning will be described.

As described above, the field of view of the objective lens 3 having a high magnification such as 20 times, 40 times, 100 times, or the like is in a range smaller than the size of the sample S. For that reason, a region in which an image can be obtained by one capturing process is smaller than the sample S. Thus, the field of view of the objective lens 3 needs to be moved with respect to the sample S in order to capture entire sample S. Here, in the image acquisition device 1, an image acquisition region is set so as to include the sample S with respect to a slide glass holding the sample S and the lane scanning for the image acquisition region is performed.

Figure 6:
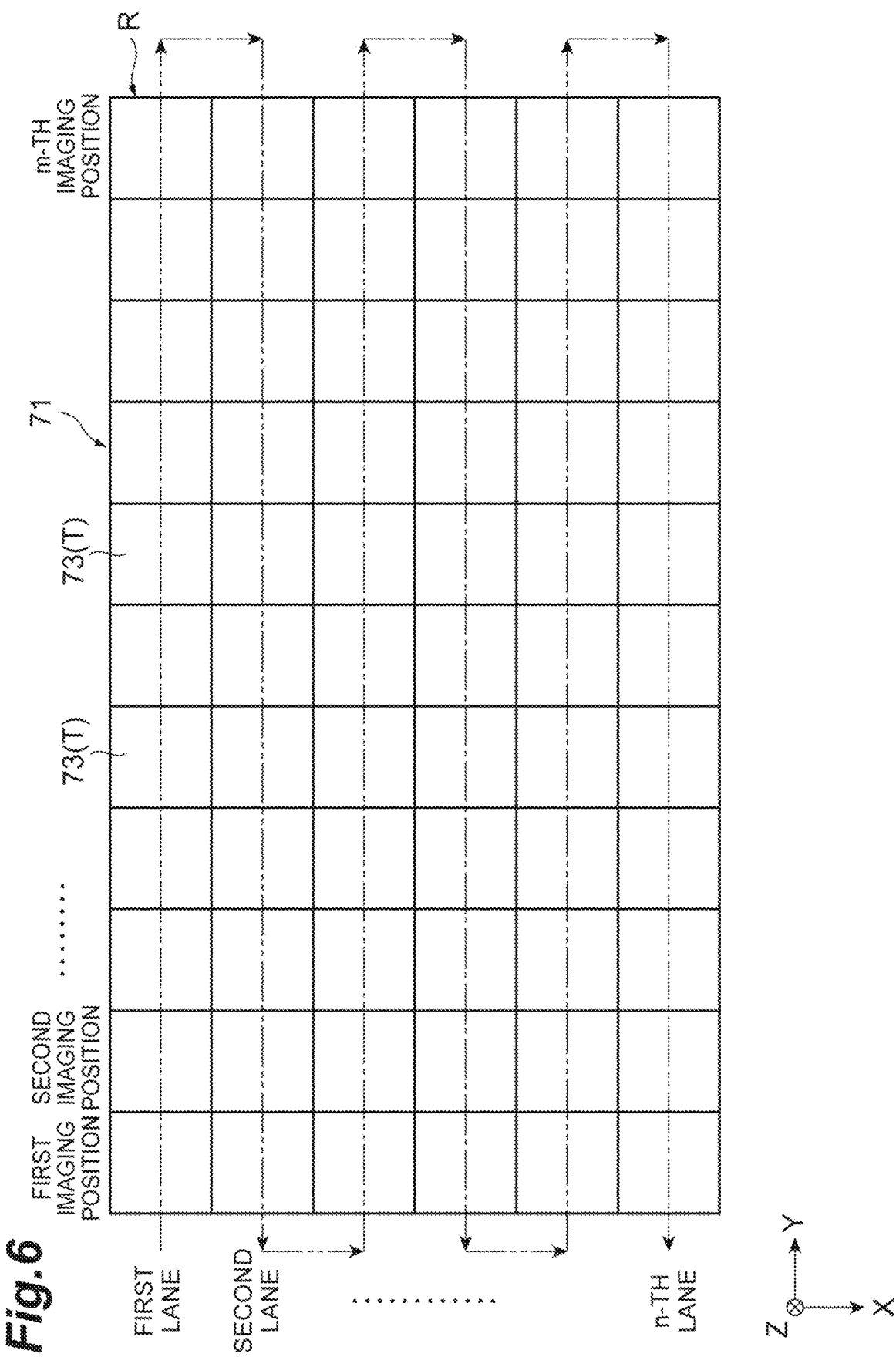
FIG. 6 is a diagram for describing a lane scanning by the image acquisition device.

FIG. 6 is a diagram for describing the lane scanning using the image acquisition device. In the embodiment, the size of the imaging visual field region of the scanning imaging element 40 is allocated to a predetermined image acquisition region 71 so that a plurality of imaging positions are set to the image acquisition region 71 in a matrix shape. In the example illustrated in FIG. 6, in the image acquisition region 71, a plurality of first to n-th lanes are set in the X direction and a plurality of first to m-th imaging positions 73 are in the Y direction (scanning direction) in each lane.

In the lane scanning, a part of the sample S is photographed by flash using instantaneous light while the stage 2 is moved in the XY directions. The image acquisition device 1 acquires a title image T corresponding to the imaging position 73, i.e., "73(T)", by capturing a part of the sample S corresponding to the imaging position 73 using the scanning imaging element 40. After the imaging field of view moves to the imaging position 73 to be captured at the next time, the image capturing process is performed again to acquire the next title image T. Then, in the image acquisition device 1, an operation of sequentially capturing the imaging position 73 is repeated in each lane so as to acquire image data including a plurality of title image rows R. The acquired image data is synthesized by the image processing unit 61 so that an image illustrating the entire sample S is formed.

As a method of moving the visual field position of the objective lens 3 by the stage driving unit 55, for example, as illustrated in FIG. 6, bi-directional scanning in which the scanning direction is reversed between adjacent lanes is adopted. The method of moving the visual field position of the objective lens 3 is not limited to bi-directional scanning, but uni-directional scanning in which the scanning direction is the same in each lane may be adopted. In FIG. 6, a relative movement direction of the objective lens 3 with respect to the image acquisition region 71 is indicated by a two-dotted arrow.

Figure 7:
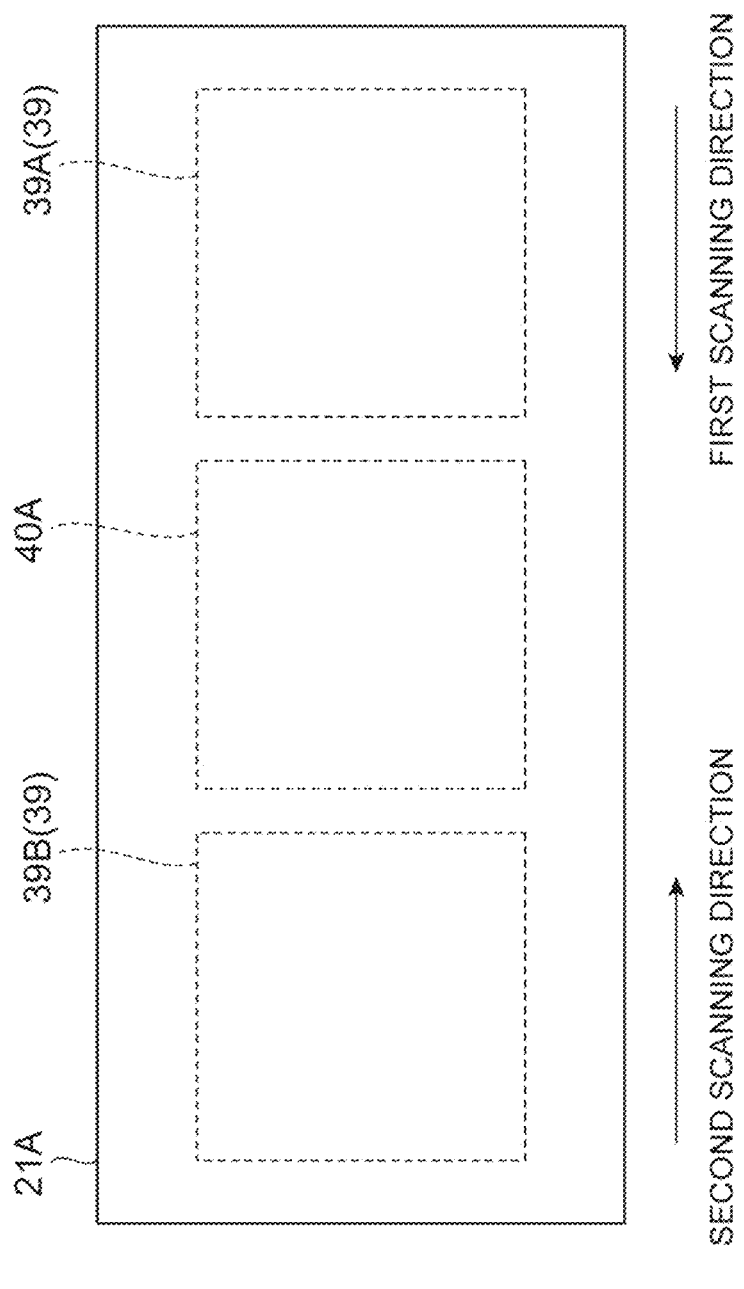
FIG. 7 is a diagram describing a relationship between an imaging visual field region and an irradiation light irradiation range.

FIG. 7 is a diagram describing a relationship between the imaging visual field region and the AF irradiation light irradiation range. FIG. 7 schematically shows a relationship between the ranges of the imaging visual field region (second imaging region) 40A and the focus control region (first imaging region) 39 on the sample S. Additionally, the imaging visual field region 40A is a region which is captured by the scanning imaging element 40 and constitutes the title image T. The focus control region 39 is a region which calculates the in-focus position.

As illustrated in FIG. 7, an irradiation light irradiation range 21A of the AF irradiation optical system 20 includes the imaging visual field region 40A of the scanning imaging element 40. Further, in the embodiment, since bi-directional scanning is adopted as described above, the focus control region 39 can be adjacently set to each of one side and the other side of the imaging visual field region 40A (see FIG. 7). In the example of FIG. 7, a focus control region 39A when the stage 2 is moved in the first scanning direction and a focus control region 39B when the stage 2 is moved in the second scanning direction are illustrated. In this way, the imaging visual field region 40A is behind the focus control region 39 in the scanning direction.

Figure 8:
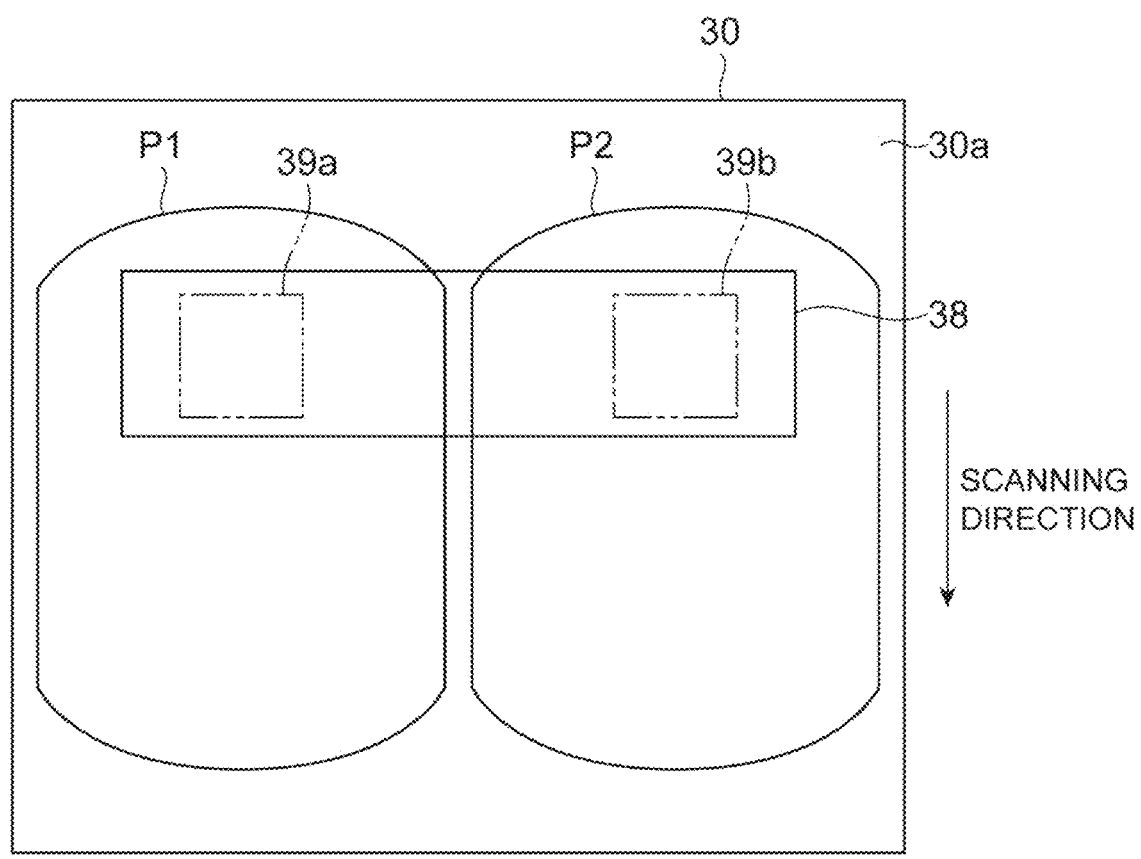
FIG. 8 is a diagram describing a relationship between a sub-array region and first and second optical images.

FIG. 8 is a diagram describing a relationship between the sub-array region of the AF imaging element and the first and second optical images. In FIG. 8, the first optical image P1 and the second optical image P2 are formed on the imaging surface 30a of the AF imaging element 30. The first optical image P1 and the second optical image P2 respectively include a partial region 39a and a partial region 39b which are the optical images of the focus control region 39 of the sample S. In the AF imaging element 30, a sub-array region 38 is set so as to include the partial region 39a and the partial region 39b. For that reason, the AF imaging element 30 can rapidly acquire image data necessary for the focus control. Additionally, the first optical image P1 and the second optical image P2 which are divided by the pupil dividing element 33 are separated from each other in the imaging surface 30a of the AF imaging element 30. Further, the first optical image P1 and the second optical image P2 have the same shape as that of the field stop.

Figure 9:
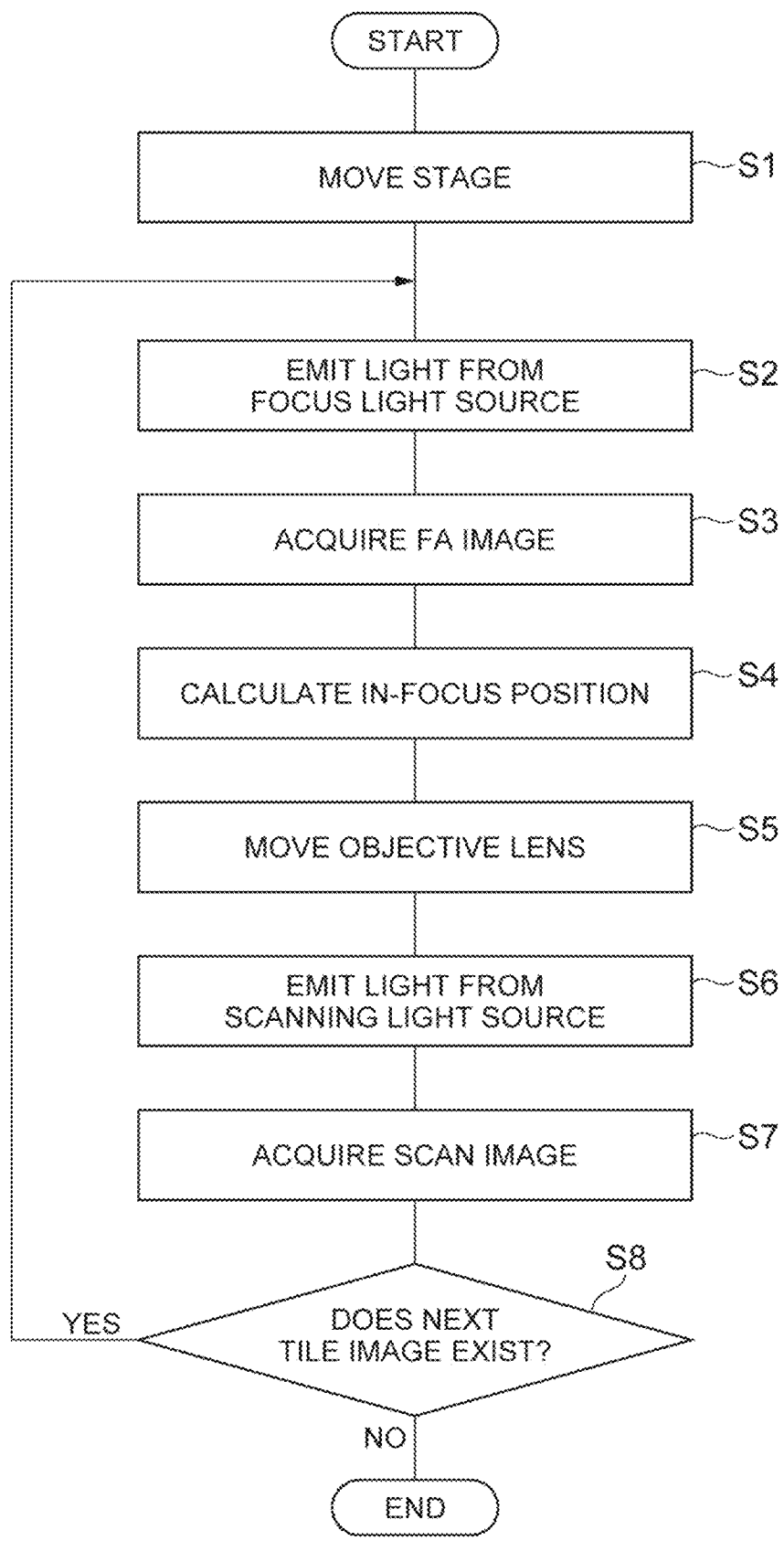
FIG. 9 is a flowchart illustrating an image acquisition method.

Next, an operation of the image acquisition device 1 will be described. FIG. 9 is a flowchart illustrating an operation of the image acquisition device 1. The flowchart of FIG. 9 illustrates a basic flow until an image is acquired from the focus control as an example of the image acquisition method. In the embodiment, the sample S is placed on the stage 2 in advance so as to face the objective lens 3 (a preparation step). Next, the position of the stage 2 is moved in the scanning direction with respect to the objective lens 3 by the driving of the stage driving unit 55 (step S1: a movement step). In the embodiment, when the stage 2 moves at a constant speed in the scanning direction, the objective lens 3 relatively moves toward the side opposite to the scanning direction with respect to the stage 2.

Next, the sample S placed on the objective lens 3 is irradiated with the irradiation light from the AF light source 21 (step S2: a first irradiation step). The irradiation light for the sample S is guided by the objective lens 3. The optical image of the sample S is divided into the first optical image P1 and the second optical image P2 by the pupil dividing (a pupil dividing step) and is captured by the AF imaging element 30. In the embodiment, the sub-array region 38 is set in the AF imaging element 30 so as to include the partial regions 39a and 39b which are partial regions of the first optical image P1 and the second optical image P2. For that reason, the AF imaging element 30 can capture the focus control region 39 in the sample S by sub-array reading for the sub-array region 38. The captured data is acquired as first image data (step S3: a first image acquisition step). The acquired first image data is analyzed by the image processing unit 61 so that the in-focus position in the focus control region is calculated (step S4: an analysis step). When the objective lens driving unit 50 is driven on the basis of the calculation result, the focus position of the objective lens 3 with respect to the sample S is controlled (step S5: a focus control step).

Next, the irradiation of the irradiation light from the scanning light source 11 is performed while the focus position of the objective lens 3 is controlled (step S6) and the optical image of the sample S in the imaging visual field region is captured by the scanning imaging element That is, the focus position of the objective lens 3 is controlled before the imaging visual field region is captured by the scanning imaging element 40. Accordingly, second image data which is the title image T is acquired (step S7: a second image acquisition step). The movement of the stage 2 in step S1 is continuously performed and the focus control region captured in step S3 moves to the focus control region in step S6 from step S3 to step S6. That is, in the second image acquisition step, the second image data is captured while the imaging visual field region is moved to the focus control region by the scanning operation.

Next, it is determined whether the next title image T exists in the lane by the drive control unit 62 (step S8). When it is determined that the next title image T exists, the process returns to step S2 again. Meanwhile, when it is determined that the next title image T does not exist, the acquisition of the image in the lane ends. Additionally, when the tile image exists in the next lane, the stage 2 is moved in the X direction so that the position of the objective lens 3 with respect to the stage 2 moves to the position of the next lane. Then, the process from step S1 is resumed while the scanning direction is set to the opposite direction.

Figure 10:
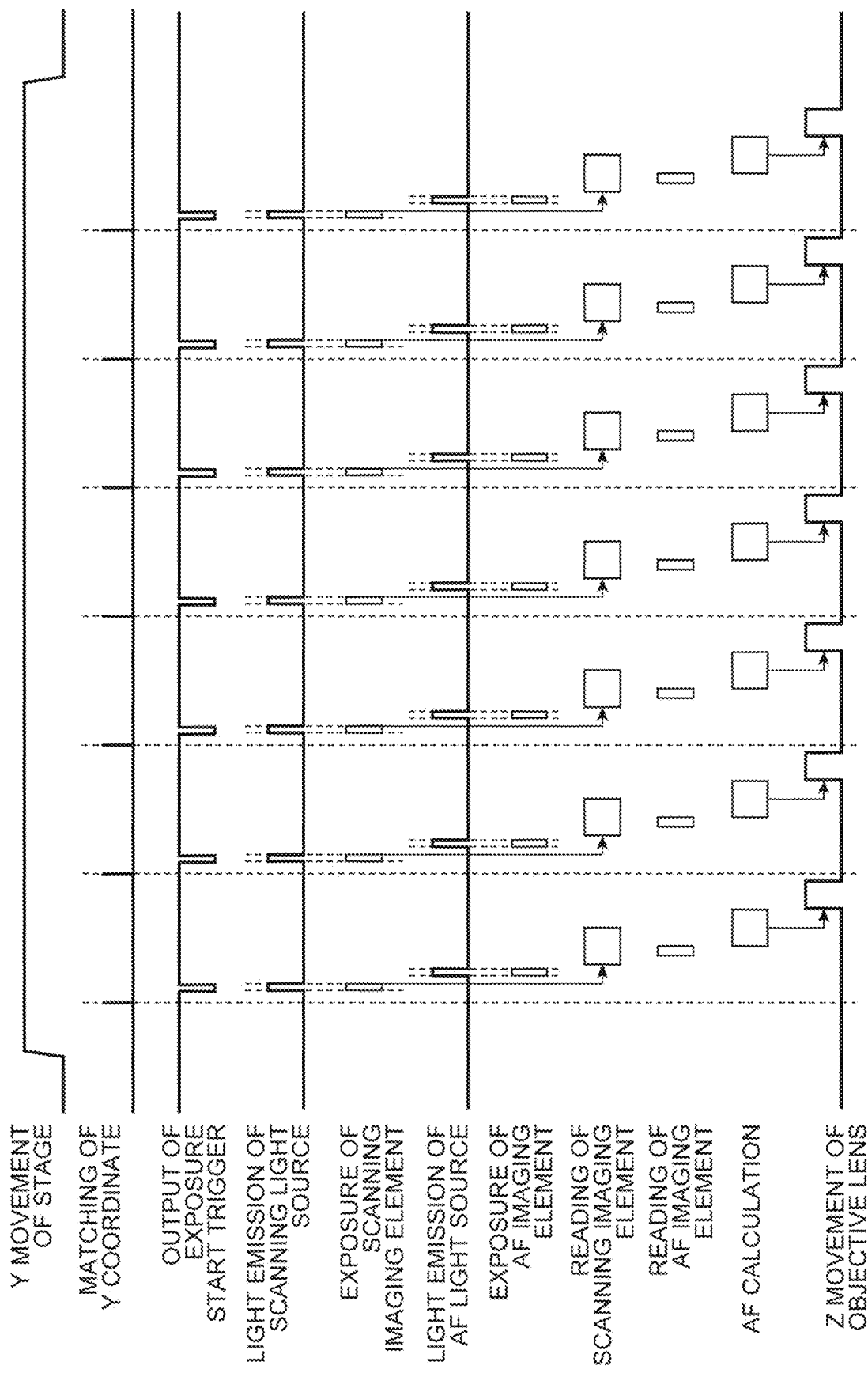
FIG. 10 is a timing chart for describing an operation of the image acquisition device.

FIG. 10 is a timing chart for describing an operation of the image acquisition device 1. FIG. 10 is a timing chart when acquiring an image of one lane. When the image capturing process by the image acquisition device 1 is performed, the stage 2 moves at a constant speed while the Y direction is the scanning direction as illustrated in FIG. 10. When the drive control unit 62 detects that the position of the Y coordinate of the stage 2 moves to the imaging position of the title image T, the drive control unit 62 outputs a trigger signal for instructing the start of exposure of the scanning imaging element 40 to the scanning imaging element 40. At the same time, the drive control unit 62 outputs a trigger signal for instructing the irradiation of the instantaneous light by the scanning light source 11 to the light source.

Further, at a timing in which the exposure of the scanning imaging element 40 is completed by the exposure start trigger signal, the drive control unit 62 outputs a trigger signal for instructing the start of exposure of the AF imaging element 30 to the AF imaging element 30. At the same time, the drive control unit 62 instructs a trigger signal for instructing the irradiation of the instantaneous light using the AF light source 21 to the AF light source 21. The focus control region captured by the AF imaging element 30 is a region scheduled to be captured at the next time by the scanning imaging element 40. The drive control unit 62 performs an autofocus calculation (AF calculation) based on the data output from the AF imaging element 30 so as to move the objective lens 3 in the Z-axis direction on the basis of the AF calculation result. The movement of the objective lens 3 in the Z-axis direction ends until the stage 2 moves to the position of acquiring the next title image T. For that reason, the in-focus state is set at a time point in which the next title image T is acquired. Then, when the drive control unit 62 detects that the position of the Y coordinate of the stage 2 moves to the imaging position of the next title image T, a trigger signal is output as described above. This control is repeated until the lane scanning ends. When the n-th lane scanning ends, the stage 2 starts to move in the X direction in order to start the n+1-th lane scanning Additionally, in the embodiment, in each lane, an image capturing process is started from the outside of the imaging region by one tile image. For that reason, the title image which is acquired first in the timing chart of FIG. 10 is located at the outside of the imaging region.

As described above, in the image acquisition device 1, the optical image of the sample S guided by the objective lens 3 is branched by the beam splitter into the AF optical path K1 and the scanning optical path K2. In the AF optical path K1, the optical image when the sample S is irradiated with the light L2 is captured by the AF imaging element 30. The optical image is divided into the first optical image P1 and the second optical image P2 by the pupil dividing element 33. In the AF imaging element 30, the partial region 39*a* of the first optical image P1 and the partial region 39*b* of the second optical image P2 formed by the imaging lens 35 are read in the sub-array to acquire the first image data. In the image processing unit 61, the in-focus position in the focus control region of the sample S is calculated by analyzing the first image data. For that reason, it is possible to control the focus position of the objective lens 3 based on the analysis result by the objective lens driving unit 50 before the imaging visual field region 40A is captured by the scanning imaging element 40.

Meanwhile, in the scanning optical path K2, the optical image when the sample S is irradiated with the light L1 is captured by the scanning imaging element 40. Here, since the imaging visual field region of the scanning imaging element 40 is behind the focus control region in the scanning direction, a region in the focus control region can move to the imaging visual field region with the movement of the stage 2. Since the focus position of the objective lens 3 is controlled when the imaging visual field region moves to the focus control region, the second image data is acquired at an appropriate focus position. As described above, in the image acquisition device 1, the image of the focus control region is acquired by the sub-array reading. Since the irradiation range of the light L2 is widely set so as to include the imaging visual field region, the image data of the focus control region can be acquired while the imaging visual field region is included in the irradiation range of the light L2. Thus, for example, the optical axes of the scanning irradiation optical system 10 and the AF irradiation optical system 20 can be allowed to match each other and hence the optical adjustment can be easily performed.

Further, the pupil dividing element 33 may further include the pupil division prism 33*a* and the achromatic prism 33*b* having a refractive index different from the refractive index of the pupil division prism 33*a*. In this configuration, chromatic aberration generated in the pupil division prism 33*a* can be corrected by the achromatic prism 33*b*.

Further, the imaging lens 35 may have a magnification smaller than the magnification of the imaging lens 41. In this configuration, the range of the optical image formed by the imaging lens 35 is easily made larger than the range of the optical image formed by the imaging lens 41.

Further, the mask 32 through which each of the first optical image P1 and the second optical image P2 passes is further provided at the position of the pupil of the objective lens 3. In this configuration, since the mask 32 can be disposed directly at the position of the pupil of the objective lens 3 or the position of the pupil of the objective lens 3 relayed by the relay optical system 31, the numerical aperture (NA) of the objective lens 3 can be limited.

Further, since the field stop 36 is disposed on a primary image plane of the relay optical system 31, the interference between the first optical image P1 and the second optical image P2 formed by the imaging lens 35 is further prevented.

Further, since the light L1 and the light L2 are instantaneous lights irradiated at different timings, the irradiation of the light L1 is stopped at the irradiation timing of the light L2. Accordingly, it is possible to exclude the influence of the light L1 on the optical image during the irradiation of the light L2.

Second Embodiment a. The image acquisition device 1 according to the embodiment is different from the image acquisition device 1 of the first embodiment in that a dark-field mask is further provided. Hereinafter, points different from the first embodiment will be mainly described, the same components and members will be denoted by the same reference numerals, and detailed description thereof will be omitted.

Figure 11:
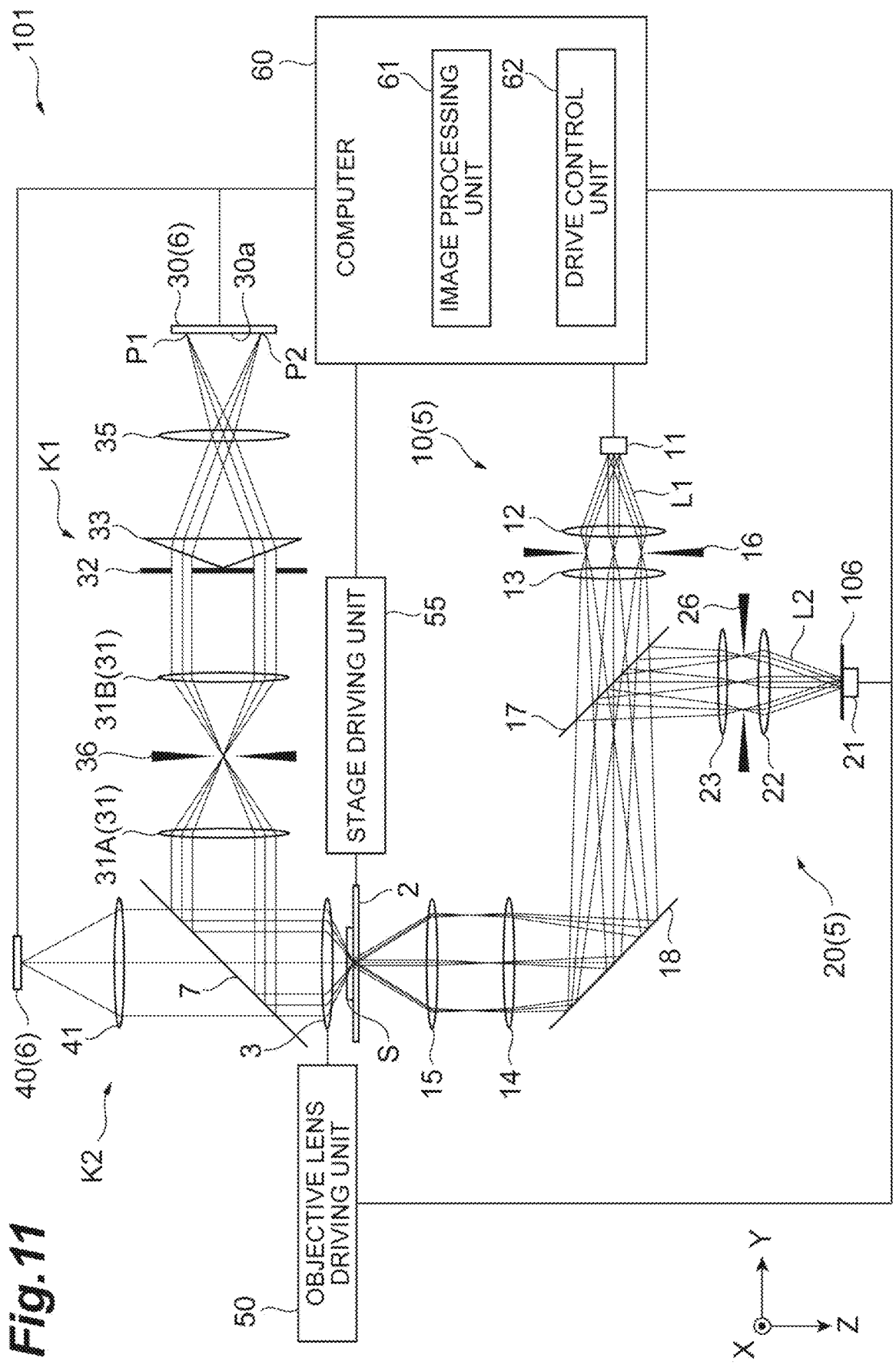
FIG. 11 is a diagram illustrating a configuration of an image acquisition device according to another embodiment.
Figure 12:
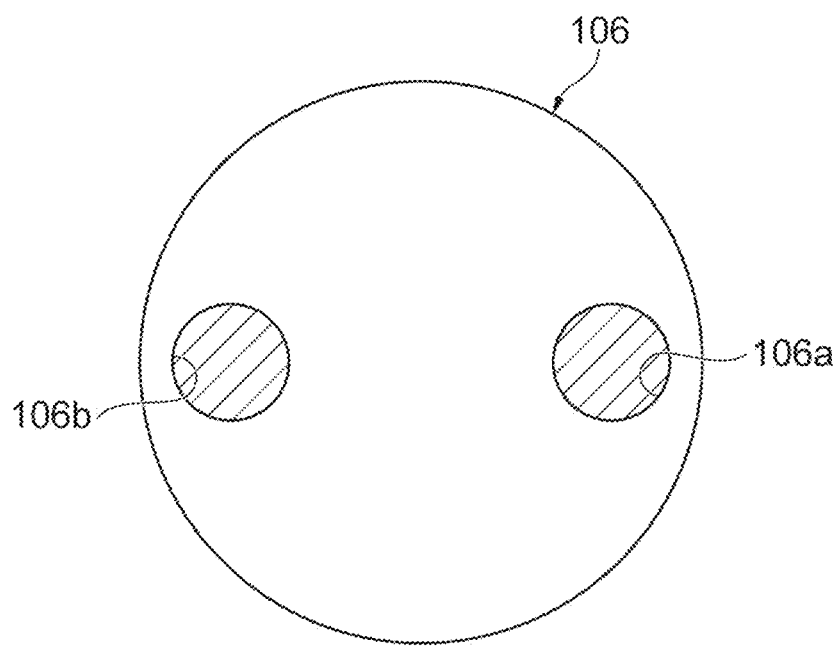
FIG. 12 is a diagram illustrating a dark-field mask.

As illustrated in FIG. 11, the image acquisition device 101 further includes a dark-field mask in addition to the configuration of the image acquisition device 1 of the first embodiment. The dark-field mask is disposed at a position conjugate with the pupil of the objective lens 3. In the embodiment, a dark-field mask 106 is disposed between the AF light source 21 and the collector lens 22. FIG. 12 is a diagram illustrating a shape of the dark-field mask. The shape of the dark-field mask 106 has a complementary relationship with the mask 32. That is, the dark-field mask 106 is provided with light shielding portions 106a and 106b only at the positions corresponding to the aperture 32a allowing the transmission of the first optical image P1 and the aperture 32b allowing the transmission of the second optical image P2 in the mask 32. A portion other than the light shielding portions 106a and 106b in the dark-field mask 106 allows the transmission of light.

In order to realize dark-field illumination, it is necessary to irradiate the sample S with irradiation light with an NA higher than the NA of the objective lens 3. When illuminating the sample S with light having a high NA, the structure of the irradiation lens or the like generally becomes large. Since there is no need to illuminate light having a higher NA than the objective lens 3 by using the dark-field mask 106, there is no need to make the irradiation lens larger. Thus, even when the sample S is a fluorescent sample, observation can be suitably performed.

The embodiment has been described in detail with reference to the drawings, but the specific configuration is not limited to this embodiment.

For example, in the above-described embodiment, an example in which the imaging visual field region and the focus control region are adjacent to each other is illustrated, but the present disclosure is not limited thereto. The focus control region may be a region corresponding to a tile image scheduled to be captured from the next time.

REFERENCE SIGNS LIST

1: image acquisition device, 2: stage, 3: objective lens, 7: beam splitter, 10: scanning irradiation optical system (second irradiation optical system), 20: AF irradiation optical system (first irradiation optical system), 30: AF imaging element (first imaging element), 33: pupil dividing element, 35: imaging lens (first imaging lens), 39: focus control region (first imaging region), 40: scanning imaging element (second imaging element), 40A: imaging visual field region (second imaging region), 41: imaging lens (second imaging lens), 55: stage driving unit (drive unit), 61: image processing unit (analysis unit), 62: drive control unit (control unit).

The invention claimed is:

1. An image acquisition device comprising:
a stage on which a sample is placed so as to face an objective lens;
a driver configured to move a relative position of the stage with respect to the objective lens in a scanning direction intersecting an optical axis of the objective lens;
first irradiation optics configured to emit first irradiation light to be used for an irradiation of the sample;
second irradiation optics configured to emit second irradiation light to be used for the irradiation of the sample;
a beam splitter configured to branch the first irradiation light and the second irradiation light guided by the objective lens into a first optical path for controlling a focus and a second optical path for acquiring an optical image of the sample;
a mask provided at a position of a pupil of the objective lens in the first optical path, the mask comprising a first aperture and a second aperture;
a pupil dividing element disposed at a rear stage of the mask and configured to divide the first optical path into a first optical image path for a first light beam and a second optical image path for a second light beam different from the first light beam such that the first optical image path associated with the first aperture of the mask is refracted in a first direction and the second optical image path associated with the second aperture of the mask is refracted in a second direction different from the first direction;
a first imaging lens configured to transmit therethrough each of the first optical image path and the second optical image path;
a first imaging element configured to include an imaging surface having a plurality of pixels arranged in two dimensions for receiving each of the first optical image path and the second optical image path from the first imaging lens, and acquire first image data by performing a method of reading a sub-array region of the plurality of pixels which form the imaging surface for at least a part of each of the first optical image path and the second optical image path formed on the imaging surface by the first imaging lens;
an analyzer configured to analyze the first image data and obtain focus information of the objective lens in a first imaging region captured by performing the method of reading the sub-array region;
a controller configured to control a focus position of the objective lens based on the focus information obtained by the analysis unit;
a second imaging lens configured to form an optical image of the sample in the second optical path; and
a second imaging element configured to capture an optical image of the sample formed by the second imaging lens and acquire second image data for forming an image of the sample,
wherein an irradiation range of the first irradiation light by the first irradiation optics includes a second imaging region captured by the second imaging element,
wherein the second imaging region is located behind the first imaging region in the scanning direction, and wherein the control unit controls a focus position of the objective lens based on the focus information before capturing the second imaging region by the second imaging element.

2. The image acquisition device according to claim 1, wherein the pupil dividing element includes a pupil division prism and an achromatic prism having a refractive index different from a refractive index of the pupil division prism.

3. The image acquisition device according to claim 1, wherein the first imaging lens has a magnification smaller than a magnification of the second imaging lens.

4. The image acquisition device according to claim 1, further comprising:
   relay optics configured to relay the pupil of the objective lens in the first optical path,
   wherein the mask is disposed at a position of the pupil of the objective lens relayed by the relay optics.

5. The image acquisition device according to claim 4, further comprising:
   a field stop which is disposed on a primary image plane in the relay optics.

6. The image acquisition device according to claim 1, wherein the first irradiation light and the second irradiation light are irradiated at different times.

7. The image acquisition device according to claim 1, wherein the first irradiation optics further include a dark-field mask at a position conjugate with a pupil of the objective lens.

8. An image acquisition method comprising:
   a first irradiation step of irradiating a sample facing an objective lens with first irradiation light in a predetermined irradiation range;
   a pupil dividing step of dividing an optical image path of the sample guided by a mask disposed at a position of a pupil of the objective lens into a first optical image path for a first light beam and a second optical image path for a second light beam different from the first light beam by pupil dividing such that the first optical image path associated with a first aperture of the mask is refracted in a first direction and the second optical image path associated with a second aperture of the mask is refracted in a second direction different from the first direction;
   a first image acquisition step of acquiring first image data by performing a method of reading a sub-array region of the plurality of pixels which form the imaging surface for at least a part of each of the first optical image path and the second optical image path using a first imaging element with an imaging surface having a plurality of pixels arranged in two dimensions for receiving each of the first optical image path and the second optical image path;
   an analysis step of analyzing the first image data and obtaining focus information of the objective lens in a first imaging region captured by performing the method of reading the sub-array region;
   a focus control step of controlling a focus position of the objective lens based on the focus information obtained by the analysis step; and
   a second image acquisition step of capturing an optical image of the sample irradiated with second irradiation light different from the first irradiation light using a second imaging element and acquiring second image data,
   wherein the predetermined irradiation range includes a second imaging region captured by the second imaging element, and
   wherein at least between the first image acquisition step and the second image acquisition step, the second imaging region is moved to the first imaging region by a scanning operation and the analysis step and the focus control step are performed.

9. The image acquisition method according to claim 8, wherein in the first image acquisition step, chromatic aberration of the first optical image path and the second optical image path divided from each other is corrected.

10. The image acquisition method according to claim 8, wherein in the first image acquisition step, the first image data is acquired at a magnification smaller than a magnification of the second image data acquired in the second image acquisition step.

11. The image acquisition method according to claim 8, wherein in the first image acquisition step, the first optical image path and the second optical image path are allowed to pass by the mask disposed at the position of the pupil of the objective lens.

12. The image acquisition method according to claim 8, wherein in the first image acquisition step, fields of view of the first optical image path and the second optical image path are limited by a field stop.

13. The image acquisition method according to claim 8, wherein in the second image acquisition step, irradiation of the first irradiation light is stopped.

14. The image acquisition method according to claim 13, wherein both the first irradiation light and the second irradiation light are instantaneous lights.

15. The image acquisition method according to claim 8, wherein in the first irradiation step, a part of the first irradiation light is interrupted by a dark-field mask.

\* \* \* \* \*